United States Patent [19]

Schreyer et al.

[11] 4,286,117

[45] Aug. 25, 1981

[54] DANGER ALARM SYSTEM

[75] Inventors: Karlheinz Schreyer, Wolfratshausen; Peer Thilo, Munich, both of Fed. Rep. of Germany

[73] Assignee: Siemens Aktiengesellschaft, Berlin & Munich, Fed. Rep. of Germany

[21] Appl. No.: 29,831

[22] Filed: Apr. 13, 1979

[30] Foreign Application Priority Data

Apr. 19, 1978 [DE] Fed. Rep. of Germany ....... 2817053

[51] Int. Cl.[3] .......... H04M 11/04

[52] U.S. Cl. .......... 179/5 R

[58] Field of Search .......... 179/5 R, 5 P, 2 A; 340/506, 517, 518, 521

[56] References Cited

U.S. PATENT DOCUMENTS 3,842,208 10/1974 Paraskevakos .......... 179/5 R

*Primary Examiner*—Joseph A. Popek

*Attorney, Agent, or Firm*—Hill, Van Santen, Steadman, Chiara & Simpson

[57] ABSTRACT

A danger alarm system has a plurality of alarm circuits which are operable to provide environmental signals concerning the area about the respective alarm circuits. The alarm circuits are connected to a central exchange by way of respective lines which are terminated in the exchange by respective alarm connection circuits. A write-read memory is provided for storing the busy state of the respective lines, and receives the busy state information via an input multiplexer which is connected to a line state multiplexer through a plurality of logic gates. A comparator gates through alarm and line interrupt signals for each line in response to such signals together with busy condition signals from the memory. An output multiplexer connects the comparator to respective output indicator circuits for alarm conditions and line interrupt conditions.

9 Claims, 1 Drawing Figure

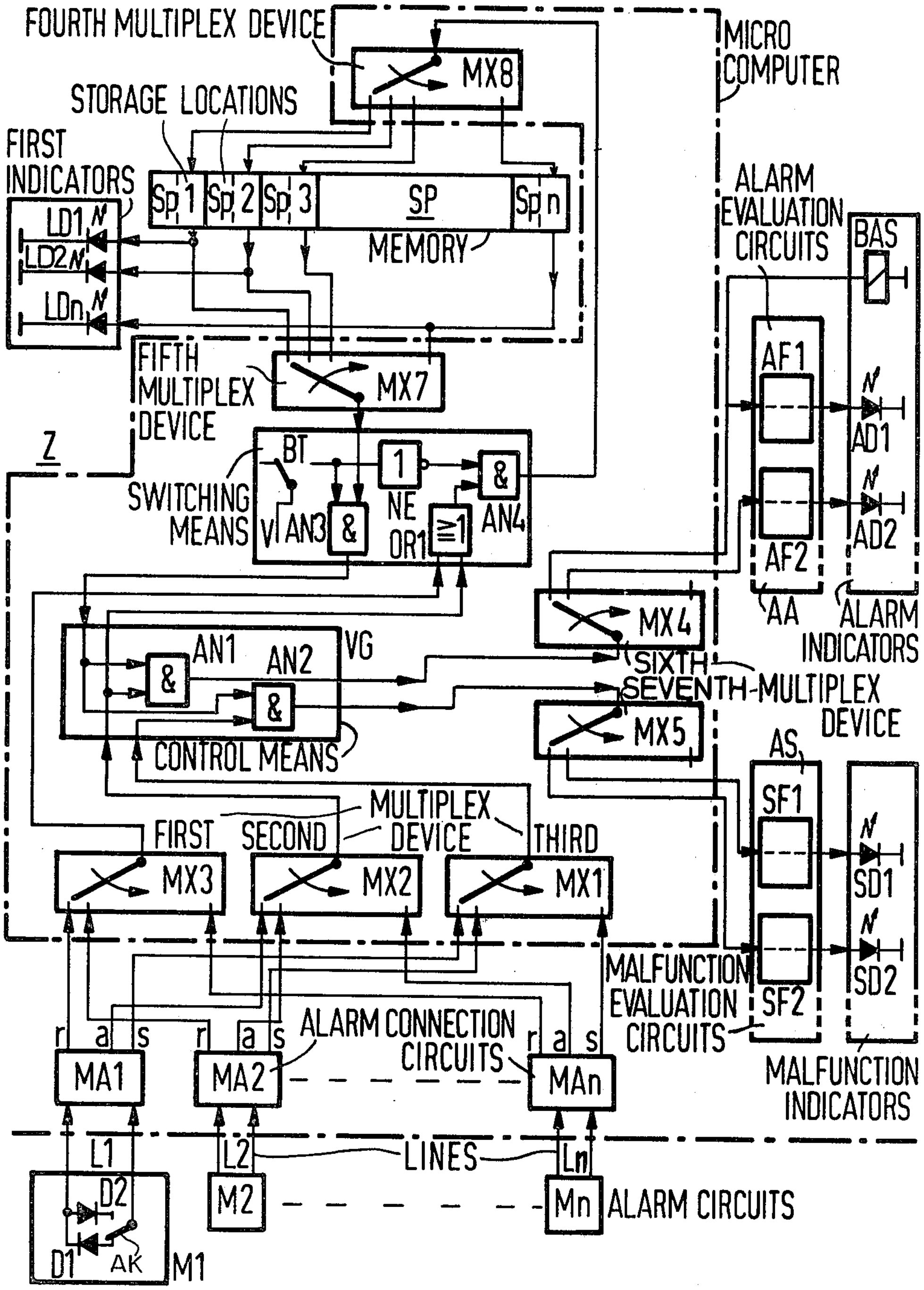
FOURTH MULTIPLEX DEVICE
MX8
MICRO COMPUTER
STORAGE LOCATIONS
FIRST INDICATORS
LD1
LD2
LDn
Sp 1
Sp 2
Sp 3
SP
Sp n
MEMORY
ALARM EVALUATION CIRCUITS
BAS
AF1
AD1
AF2
AD2
AA
ALARM INDICATORS
FIFTH MULTIPLEX DEVICE
MX7
Z
SWITCHING MEANS
BT
V
AN3
&
1
NE
OR1
≥1
AN4
&
MX4
SIXTH
SEVENTH-MULTIPLEX DEVICE
MX5
AN1
AN2
VG
CONTROL MEANS
AS
SF1
SD1
SF2
SD2
MULTIPLEX DEVICE
FIRST
SECOND
THIRD
MX3
MX2
MX1
MALFUNCTION EVALUATION CIRCUITS
MALFUNCTION INDICATORS
r a s
MA1
MA2
ALARM CONNECTION CIRCUITS
MAn
L1
L2
LINES
Ln
D2
D1
AK
M1
M2
Mn
ALARM CIRCUITS

DANGER ALARM SYSTEM

CROSS REFERENCE TO RELATED APPLICATIONS

This application is related to an application, Ser. No. 029,834 filed on Apr. 13, 1979 of Schreyer, et al and an application, Ser. No. 029,388 filed on Apr. 12, 1979 of Moser et al.

BACKGROUND OF THE INVENTION

1. Field of the Invention

The present invention relates to a danger alarm system of the type having a multiplicity of alarm circuits which are connected to an exchange by way of respective lines, and more particularly to such a system in which the state of the signals can be determined in the exchange via testing devices and indicated by an evaluation output device, wherein a write-read memory is provided in the exchange for storing the busy state of each line and a multiplex interrogation device is provided in order to interrogate the individual lines and the respective storage locations of the memory, and further wherein the interrogated alarm signals, together with the interrogated memory signals, are fed to a comparator and can only be transferred to the output device when the respective storage location is determined as busy.

2. Description of the Prior Art

In danger alarm systems, for example in public fire alarm systems, all components important for the function must be automatically monitored. A breakdown of one of the components must be indicated as a malfunction. Generally, such systems are modularly designed, in particular several lines can be connected to the connecting modules of the lines and of the input and output elements. It is therefore necessary to assign the correct display to the signals which are actually connected. and to take care that no malfunction indications are effected by the lines which are not connected.

In conventional systems this is done in two ways. The transmission of the alarm is arranged with the aid of specific lines, in the first case, and, if not desired, is prevented by interrupting these lines. In another case, a functioning operation is simulated, for example, by means of a particular terminal element which simulates an alarm ready for use. In both cases, an operation by hand must be undertaken in the wiring of the system with each alteration. The screwing or soldering operations necessary for this purpose require excessive time and present the problem, moreover, that there is always a danger of line switchings and improper connections.

In order to avoid the above disadvantages, it has been suggested to store all of the alarm configuration in a write-read memory in the exchange and to evaluate the alarm signals only when the respective alarm is indicated as being present in the memory. However, the writing of the memory by hand is cumbersome, at least for larger systems in particular, as the total signal configuration must be newly stored after every network breakdown or each time the system is switched off.

SUMMARY OF THE INVENTION

It is therefore the object of the present invention to provide a further development in danger alarm systems of the type generally mentioned above such that the busy state of all lines can be controlled in a simple manner and can be input to the write-read memory in the exchange.

This object is achieved, according to the present invention, in that a multiplex input device is provided at the input of the write-read memory, the multiplex input device being synchronously connected at the output side of a multiplex interrogation device (also a multiplex input device) and can be connected via a switch such that the instantaneous busy state of all lines can be determined and can automatically be written into the memory.

The memory is automatically written by way of the interrogation device, by means of the multiplex input device to the memory, and the process may be advantageously controlled via a microcomputer. Thereby, the system configuration can automatically and rapidly be obtained after each new start-up process of the system. According to the write-in process of the present invention, it is possible to first control the actual state of the system. For this purpose, an indicating device is advantageously provided, in which the busy state of each individual line is rendered visible. After testing the actual state of the system, recognized as accurate, the system can be started by way of a switch, in particular, an instruction key. From that time on, each deviation from the reference state now defined is evaluated as a malfunction.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic circuit diagram of a danger alarm system constructed in accordance with the present invention.

DESCRIPTION OF THE PREFERRED EMBODIMENTS

Referring to the drawing, the circuit diagram of a danger alarm system constructed in accordance with the present invention comprises a central exchange Z which has a plurality of individual lines Ll–Ln connected thereto which lead to a corresponding plurality of alarm circuits Ml–Mn. The exchange ends of the lines are connected to alarm connection circuits MAl–MAn, in which the lines and/or the alarm circuits are tested for operational state. Depending upon this state, a signal r appears at one of the three outputs for the quiescent state, a signal a appears for an alarm state, or a signal s appears for a malfunction signal, generally indicating a line interrupt state.

If one now assumes the use of diode-controlled signals, as illustrated in the alarm circuit Ml, the alarm signals result in the following manner:

(1) An ac current or a dc current having alternating polarity is output from the line Ll by the alarm circuit MAl, and as long as the alarm switch AK is in the rest state (as shown) one half wave of the line current flows via the diode D1 and results in a quiescent or rest signal r in the alarm connection circuit MAl;

(2) If the alarm switch AK is operated to the opposite position, the other half wave of the line current flows via the diode D2 and results in an alarm signal a in the alarm connection circuit MAl; and (3) With a line interruption, no current can flow through the line Ll so that the alarm connection circuit evaluates the same as a malfunction and provides a malfunction or interrupt signal s.

The malfunction signal s is also produced when both half waves can be received by way of a line short circuit. No alarm circuit is connected to the line it is also signaled as a malfunction signal s if precautionary measures are not taken in the exchange. A corresponding test or evaluation circuit (alarm connection circuit MAl) is described in the German allowed and published application No. 2,144,537 at FIG. 2.

The output signals of the alarm connection circuits MAl–MAn are synchronously interrogated by way of a multiplex interrogation unit. More particularly, the alarm signals a are interrogated by way of a multiplex interrogation device MX2, the malfunction signals s are interrogated by way of a multiplex interrogation device MX1 and the rest signals r are interrogated by way of a multiplex interrogation device MX3. The alarm signals a and the malfunction signals s are respectively fed to an evaluation device for alarm signals AA or to a malfunction evaluation circuit AS, via a comparator VG.

In order to undertake an evaluation of alarm and malfunction signals, when the respective line is indeed busy, a memory SP is additionally provided in the exchange, the memory having individual storage locations Spl–Spn which are respectively assigned to the alarm lines and in which the busy state of the respective line can be stored. The storage locations Spl–Spn are synchronously scanned with the signal connections by way of a multiplex interrogation device MX7, and the signal respectively read from the storage location is compared with the incoming malfunction signal or alarm signal in the control means, like the comparator VG. Such an alarm signal is only then transferred to the evaluation or output devices AA or AS via coincidence elements AN1 and AN2 when the respective storage location characterizes the corresponding line as being busy and thus provides a logic "1".

A multiplex input device MX8 is connected in series with the memory SP for an automatic write-in operation, the multiplex input device MX8 also operating synchronously with the interrogation devices MX1, MX2 and MX3. If the actual state of the alarm system is now to be determined and stored, i.e. if it is to be started up, the operating key BT is open, as illustrated on the drawing. The AND gates AN1 and AN2 are blocked via the AND gate AN3 and do not permit signals received from the interrogation multiplexers MX1 and MX2 to pass through the comparator. In contrast thereto, a busy state is respectively being written into the memory SP via an OR gate OR1 and an AND gate AN4 when a rest signal r or an alarm signal a is signaled by the respective alarm connection circuits MAl–MAn. In those cases, an alarm circuit is connected to the respective line.

If a malfunction signal s is output from a relevant alarm connection circuit MA, a logic "0" is written into the respective storage location, i.e. the respective line is provided with a busy state of "not busy". If the total memory SP is written, the actual state of this system can be tested via first indicators, like a display device which has a plurality of luminous diodes LDl–LDn. If this state is found correct, the system can be started via the operating key BT. Now the AND gate AN4 is blocked via an inverter NE1 so that the memory state can no longer be altered. Only then are malfunction signals or alarm signals transferred to the output evaluation circuits AA and AS via the AND gates AN1 and AN2 when the respective storage location indicates a busy state of the respective line.

The alarm output evaluation circuit AA and the malfunction output evaluation circuit AS respectively contain multiplex output devices MX4 and MX5 by way of which an alarm signal a or a malfunction signal s of a specific line is used in the display device for switching-on the respective luminous diodes ADl–ADn or SDl–SDn. In order to stabilize the display, a flip-flop AFl–AFn or SFl–SFn is respectively assigned to each luminous diode. Moreover, the alarm signal is fed to a bistable alarm switch BAS which provides a conventional acoustic alarm, or transfers the alarm signal to a superordinate exchange.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A danger alarm system comprising:

a plurality of alarm circuits operable to provide first signals representing a quiescent condition and second signals representing an alarm condition;

a plurality of signal lines each connected to a respective alarm circuit;

a plurality of alarm connection circuits each connected to a respective signal line and each having three outputs and each operable to provide a rest signal at a first output in response to a first signal, an alarm signal at a second output in response to a second signal and a malfunction signal at a third output in response to the absence of the first and second signals;

a memory including a plurality of storage locations each including an input and an output and each assigned to and operable to store the busy and non-busy state of a respective line;

a plurality of first indicators each connected to said output of a respective storage location and operable in response to a busy state to indicate seizure of the respective line; and a plurality of synchronously operable multiplex devices, first, second and third ones of said multiplex devices sequentially connected to said alarm connection circuits to read said first, second and third outputs, respectively, of said plurality of alarm connection circuits, said memory comprising:

input means including a fourth one of said multiplex devices sequentially connectible to said inputs of said memory;

switching means connected between said first and second multiplex devices and said fourth one of said multiplex devices and selectively operable in a first mode to pass said rest and alarm signals as busy state signals to said memory and in a second mode to block the passage of said rest signals to said memory, output means including a fifth one of said multiplex devices connected to read the outputs of said memory and connected to said switching means, and control means connected to said second and third multiplex devices and to said switching means, including first and second outputs, and operable in response to conjunct busy state and alarm signals to provide the alarm signal at said first output and in response to conjunct busy state and malfunction signals to provide the malfunction signal at said second output.

2. The danger alarm system of claim 1, and further comprising:

a plurality of alarm output circuits each assigned to a respective line and each including an alarm indicator;

a plurality of malfunction output circuits each assigned to a respective line and each including a malfunction indicator;

a sixth one of said multiplex devices connected to said first output of said control means and sequentially connectible to said plurality of alarm evaluation circuits for operating said alarm indicators in response to the alarm signals; and a seventh one of said multiplex devices connected to said second output of said control means and sequentially connectible to said plurality of malfunction evaluation circuits for operating said malfunction indicators in response to the malfunction signals.

3. The danger alarm system of claim 2, wherein said memory input switching means is further defined as comprising:

first gate means for receiving said alarm and rest signals; and a switch connected to said gate means and selectively operable to provide a gate operating signal to open said first gate means and to provide a gate blocking signal to block said first gate means.

4. The danger alarm system of claim 3, wherein said first gate means comprises:

an OR gate including an output, a first input connected to said first multiplex device and a second input connected to said second multiplex device;

an inverter; and an AND gate including a first input connected by way of said inverter to said switch, a second input connected to said output of said OR gate, and an output connected to said fourth multiplex device.

5. The danger alarm system of claim 4, wherein said memory input switching means further comprises:

second gate means connected between said fifth multiplex device and said control means and connected to and operated by said switch to block in response to the gate operating signal and to open in response to the gate blocking signal.

6. The danger alarm system of claim 5, wherein said second gate means comprises:

a further AND gate including an input connected to said fifth multiplex device, an input connected to said switch and an output connected to said control means.

7. The danger alarm system of claim 6, wherein said control means comprises:

comparator means connected between said switching means, said second, third, fifth, sixth and seventh multiplex devices to control operation of said alarm and malfunction evaluation circuits in response to said busy state signals of said memory together with said alarm and malfunction signals, respectively, of said alarm connection circuits.

8. The danger alarm system of claim 7, wherein said comparator means comprises:

a first AND gate including a first input connected to said output of said further AND gate of said switching means, a second input connected to said second multiplex device and an output connected to said sixth multiplex device; and a second AND gate including a first input connected to said output of said further AND gate of said switching means, a second input connected to said third multiplex device, and an output connected to said seventh multiplex device.

9. The danger alarm system of claim 8, wherein said multiplex devices, said switching means and said control means are constituted by a microcomputer.

* * * * *